Figure 1:
Figure 2:
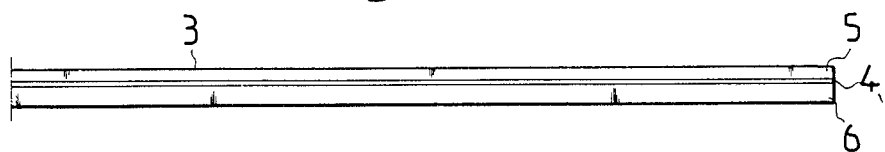
Figure 3:
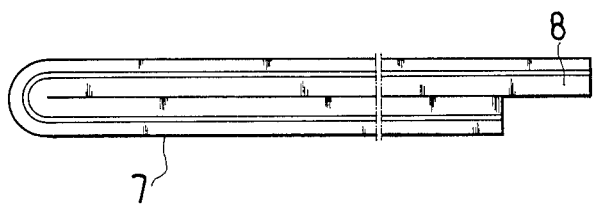
Figure 4:
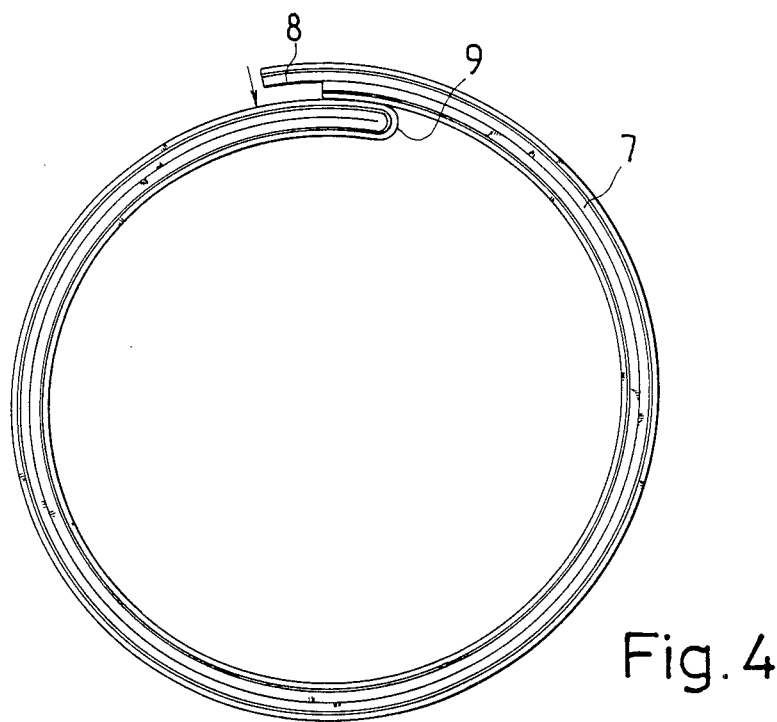

United States Patent [19]  
Mäkilaakso

[11] Patent Number: 4,613,536  
[45] Date of Patent: Sep. 23, 1986

[54] PACKAGING FOIL

[75] Inventor: Antero Mäkilaakso, Espoo, Finland

[73] Assignee: Printal OY, Helsinki, Finland

[21] Appl. No.: 666,286

[22] Filed: Oct. 29, 1984

[30] Foreign Application Priority Data

Nov., 1983 [FI] Finland .................................. 834031

[51] Int. Cl.⁴ ........................ B32B 3/04; B29D 23/10; B65D 73/00
[52] U.S. Cl. ..................................... 428/124; 428/76; 428/461; 156/218; 156/226; 206/484
[58] Field of Search ................ 428/513, 461, 124, 76; 156/226, 227, 203, 217, 218, 215; 206/484

[56] References Cited

U.S. PATENT DOCUMENTS 2,774,698 12/1956 Jenk et al. ............................ 428/513  
3,297,515 1/1967 Regenstein et al. ................. 428/513  
3,976,224 8/1976 Ericson et al. ...................... 428/461  
4,158,587 6/1979 Keller et al. ......................... 428/124  
4,310,578 1/1982 Katsura et al. ...................... 428/461

Primary Examiner—John E. Kittle  
Assistant Examiner—James J. Seidleck  
Attorney, Agent, or Firm—Martin Smolowitz

[57] ABSTRACT

A packaging foil for foods and other everyday goods, the foil being composed of two or more barrier layers as well as plastic coatings between the barrier layers and which form the outer surfaces of the foil; in addition, the invention provides for a method of manufacturing the foil. With the object of achieving a thin, stiff and accordingly advantageous foil, the packaging foil has been formed by joining together and sealing sheets containing one barrier layer, one side of said sheets having been covered with a layer of plastic intended for the protection of the inner layer and outer layer and the other side with a layer of plastic intended for separating and insulating the barrier layers.

5 Claims, 4 Drawing Figures

PACKAGING FOIL

BACKGROUND OF INVENTION

This invention concerns a packaging foil for foods and other everyday goods, the foil being composed of two or more barrier layers as well as plastic coatings between the barrier layers and which form the outer surfaces of the foil; in addition, the invention provides for a method of manufacturing the foil.

Closed or lined containers made of foil and often provided in one way or another with barrier layers are used for preserving foods and other everyday goods. Tubes in which the foil itself also constitutes the bearing structure are a very common group within foil packaging. The job of the barrier layer, for example aluminium metal, is to serve as a protective layer through which environmental substances are not allowed to penetrate into the container, and vice versa.

Since most metals corrode, they should not be permitted to come into contact with the substance to be preserved but should be protected. Protection of the metal is generally provided by a plastic or protective lacquer film which is spread on, say, the aluminium foil when the foil is being manufactured. Owing to considerations of dyeing, weight and the like, some kind of protective coating is applied to both sides of the foil. Several manufacturing methods and substances are known in the production of foil, for example, Finnish patent applications Nos. 820247 and 821686 and U.S. Pat. No. 3,817,427.

All known methods of manufacturing foil are based on the idea of spreading an inexpensive and soft bulk polymer, most often polyethylene, in a sufficiently thick layer on the metal. A requirement of the protective layer is that it be thick, owing to sealing considerations and the like, since there must be a sufficient amount of sealing compound in the hot sealing operation. A reason for the fact that this drawback has not been corrected previously is the cheapness of bulk plastic. The view has been held that the seal of a foil casing requires a thick, readily melting plastic film in order to achieve adequate seal strength and sufficient stiffness of the foil.

In a number of packages such as tubes, the irreversibility of the forms of the compressed foil package is important. This can only be achieved with a foil provided with one metal barrier layer by making the barrier layer unduly thick so that its contours will not spring back due to the resilience of the plastic layers.

Generally known are foils based on the "sandwich" principle and incorporating several barrier or supporting structures. Such foils have been presented, for instance, in the German patent publications Nos. OS-DE 30 24 725 and OS-DE 31 13 428. These patents are nevertheless directed at specially stiff, self-supporting foils whose method of manufacture involves a laborious and multiphase coating layer by layer. They are not suited for making and mass producing the kind of packages in which the foil is folded and sealed in a manner such as the hot sealing process. No effort has been made to obtain savings of material in these solutions; rather, they seek to improve structural strength.

The foil edge remaining inside the container to be formed is also problematical in the known solutions because the edge of the barrier layer should not in most cases be allowed to enter into contact with the substance to be preserved. It has been attempted to solve this problem by means of an extra hot sealing treatment with an amount of fluid plastic as well as by "concealing" the edge under the fold. The first mentioned method is unsure and calls for the use of even thicker plastic films; the second mentioned method is serviceable but entails special measures prior to sealing.

SUMMARY OF INVENTION

The purpose of this invention is to avoid the above mentioned drawbacks and achieve a packaging foil that is thin and nevertheless continues to have sufficient stiffness for all the usage purposes of packaging foils. The packaging foil specified by the invention is thus chiefly characterized by the fact that the foil is formed by joining together and sealing sheets containing at least one barrier layer, one side of said sheets being covered with a plastic layer intended to protect the inner and outer surfaces and the other plastic layer being intended for sealing as well as separating and insulating the barrier layers.

The sheet material of the packaging foil according to the invention can be manufactured in the normal way using presently existing equipment. The sheet is folded to form a foil and hot sealed e.g. in a simple hot press. Because of its sandwich structure, the stiffness of the foil is good enough for most packaging purposes when the sheet is merely folded double. The advantage of a sheet folded an even number of times is that the fold point of the ready foil forms an edge in which the barrier layers are not exposed to the ambient air but are covered by an intact plastic film. It is indeed characteristic of an advantageous mode of application of the invention that the foil has been formed by folding the foil sheet double.

It is also characteristic of a certain advantageous mode of application of the packing foil according to the invention that the foil has been folded unsymmetrically in such a way that the layers are of differing length, the tongue of the longer layer forming a sealing element. The sealing element is used for making external seals simply by hot sealing the side of the tongue provided with the thicker layer of plastic across the lower layer and fast to the foil casing.

It is furthermore characteristic of a certain advantageous mode of application of the packaging foil according to the invention that the barrier layers of the foil are composed of aluminium foil and that the outer surface of the foil is composed of a polyethylene film and that the sealing layer between the barrier layers is composed of two sheets of polyethylene films that are sealed together.

A desirable thickness of the aluminium foil is e.g. 10 $\mu$m, the thickness of the outer surface of the foil approx. 30 $\mu$m and the total thickness of the seal layer approx. 100 $\mu$m.

It is characteristic of a certain other mode of application of the packaging foil according to the invention that the barrier layers of the foil are composed of cardboard, the thickness and grade of which has been chosen in accordance with the desired stiffness and barrier properties, and that the outer surface of the foil is composed of a polyethylene film and that the seal layer between the barrier layers is composed of two sheets of polyethylene film that have been sealed together.

It is characteristic of the manufacturing method of the packaging foil according to the invention that the foil is formed by joining together and sealing sheets